UNITED STATES PATENT OFFICE.

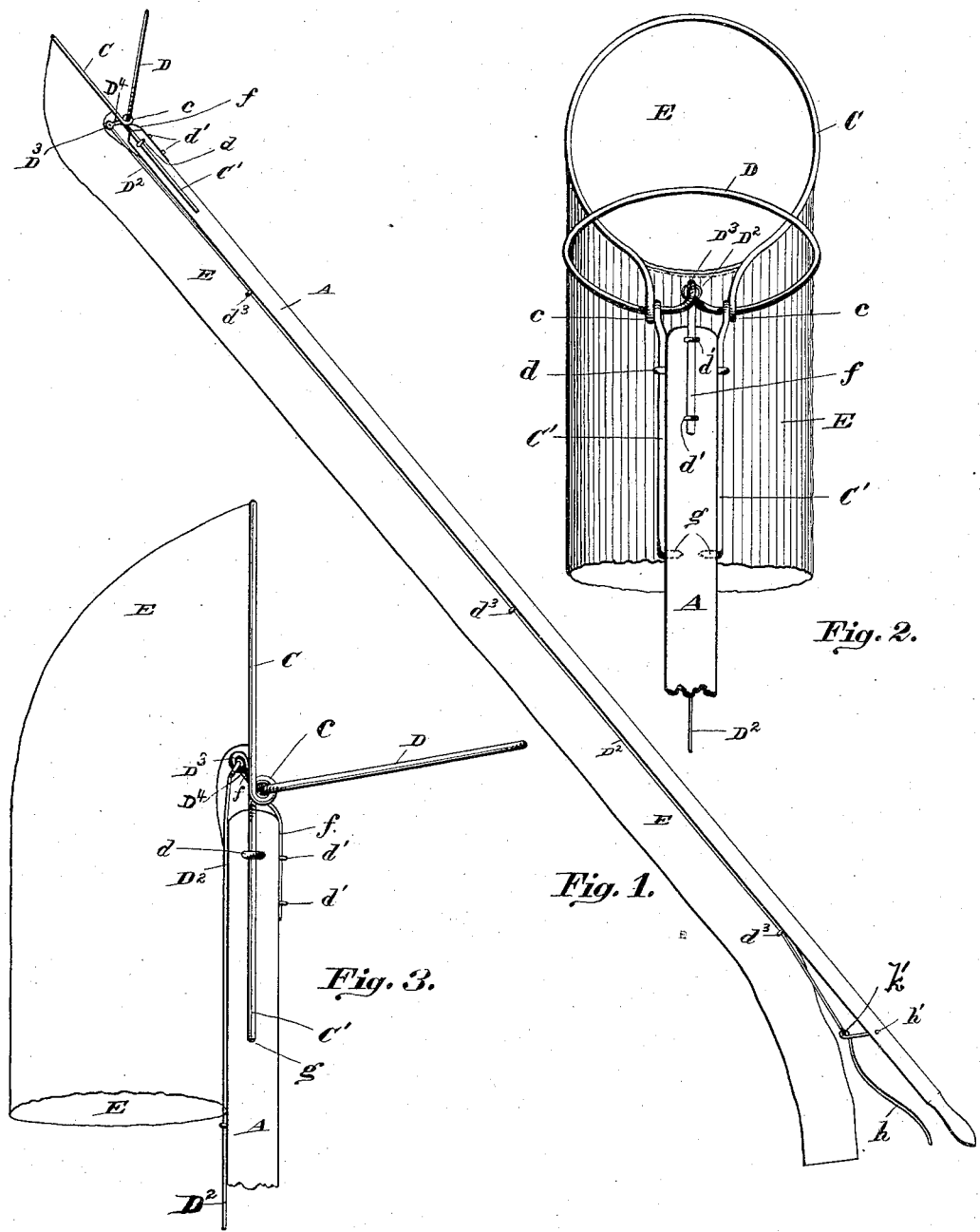

GEORGE J. KUEHN, OF DELHI, OHIO.

FRUIT-PICKER.

SPECIFICATION forming part of Letters Patent No. 371,951, dated October 25, 1887.

Application filed August 30, 1886. Serial No. 212,211. (No model.)

*To all whom it may concern:*

Be it known that I, GEORGE J. KUEHN, a resident of Delhi, in the county of Hamilton and State of Ohio, have invented certain new and useful Improvements in Fruit-Pickers, of which the following is a specification.

The object of my invention is to produce a fruit-picker which will not easily get out of order, is simple of construction, and which can be manufactured at a very small expense, and consequently sold very cheaply.

In the accompanying drawings, forming part of this specification, Figure 1 represents a side view of my fruit-picker; Fig. 2, an enlarged front view of the upper part of the picker, and Fig. 3 is an enlarged side view of the top part of the picker.

A represents a pole provided at its lower end with a suitable handle. (See Fig. 1.)

E represents a conveyer through which the fruit is carried into any suitable receptacle.

The pole A and conveyer E may be made of any suitable material and of any desired or convenient length, shape, and size. The conveyer E is preferably permanently attached to the pole A nearly its entire length, being only detached at its end near the handle, as shown in Fig. 1.

The rod $D^2$, preferably made of wire, runs along the under side of the pole A adjacent to the conveyer E, and is held in position and works loosely in the staples $d^3$. At its lower end the rod $D^2$ is slightly bent outward from the pole, in order to meet the eye $k'$ of the hand-lever $h$, in which eye $k'$ it is hooked and fastened, as shown in Fig. 1. This hand-lever $h$ is of suitable form, preferably of the form shown, and is made of wire, bent at $k'$ to form an eye, and then bent over and attached loosely to the pole A, at $h'$. The upper end of the rod $D^2$ is hooked into the eye $D^3$ of the short arm $D^4$ of the jaw D.

The mouth of the picker is composed of the two jaws C D, preferably annular in shape and made of wire. To the jaw C, which is preferably stationary, is attached the conveyer E. (See Fig. 2.) This jaw C has two arms, C', each bent at $c$ to form an eye, and terminating in the points $g$, which are embedded in the pole A, to hold the jaw C, in connection with the staples $d$, in position. The jaw D, preferably similar in shape to the jaw C, except that it has no arms C', works loosely in the eyes $c$ of the jaw C, and terminates in the arm $D^4$, having an eye, $D^3$, in which is hooked the upper end of the rod $D^2$. The spring $f$ is securely attached to the upper end of the pole by staples $d$, then extends over the top of the pole A, and then under the short arm $D^4$ of the jaw D, and its tendency is to keep the jaw D open.

The device operates as follows: The mouth of the picker is brought under or near to the fruit to be picked. The fruit hanging between the jaws C and D, the hand-lever $h$ is drawn down. This draws the rod $D^2$ downward, and this rod, being attached to the short arm $D^4$ of the jaw D tips said arm, and thus closes the jaw D, which in closing carries the fruit with it into the mouth of the conveyer E, which conveys it into the basket or any other suitable receptacle. Then the hold on the hand-lever is released and the jaw D, through the agency of the spring $f$, is opened, and the device is ready to pick more fruit.

This fruit-picker is light, looks neat, is cheap, and has no heavy castings; but all its working parts are made of wire.

I am aware that it is not new to construct a fruit-picker by the use of a pole, conveyer, and movable and stationary jaws, and do not claim such construction, broadly; but

What I claim as new and of my invention, and desire to secure by Letters Patent, is—

In a fruit-picker, the combination of the pole A, stationary jaw C, having arms C', staples $d$, movable jaw D, having arm $D^4$, spring $f$, one end of said spring being rigidly attached to the pole and the other end left free to impinge against arm $D^4$, rod $D^2$, and conveyer E, and hand-lever $h$, substantially as and for the purposes set forth.

GEORGE J. KUEHN.

Witnesses:
H. L. COOPER,
JNO. W. STREHLI.